DONALD J. HACKMAN
JEREMY M. HARRIS
RONALD L. LEGUE
DONALD E. ROOP
INVENTORS

BY Gray, Mase & Dunson
ATTORNEYS

DONALD J. HACKMAN
JEREMY M. HARRIS
RONALD L. LEGUE
DONALD E. ROOP
INVENTORS

BY *Gray, Mase &
Dunson*
ATTORNEYS

DONALD J. HACKMAN
JEREMY M. HARRIS
RONALD L. LEGUE
DONALD E. ROOP
INVENTORS

BY Gray, Mase &
Dunson
ATTORNEYS

United States Patent Office 3,555,383
Patented Jan. 12, 1971

3,555,383
SUBMERSIBLE ELECTRIC MOTOR FOR TOOL OPERATION
Donald J. Hackman, Columbus, Jeremy M. Harris, Worthington, Ronald L. Legue, Columbus, and Donald E. Roop, Worthington, Ohio, assignors to The Battelle Development Corporation, Columbus, Ohio, a corporation of Delaware
Filed Aug. 23, 1968, Ser. No. 754,783
Int. Cl. H02p 1/44
U.S. Cl. 318—221      7 Claims

ABSTRACT OF THE DISCLOSURE

An electric motor of the induction type capacitor-start constructed to allow water to flow through the motor lubricating the bearings and a gear box. There is an absence of dynamic seals and the windings of the stator are sealed in a potting compound. Electrical conducting components are sealed and potted and a trip circuit is included to shut off the electrical power if there is any current from the high voltage lines that might endanger the operator. Two output shafts are included and they rotate at different speeds being connected to the motor shaft through the gear box. There is a reversing switch to provide for rotating a tool clockwise or counterclockwise.

FIELD OF THE INVENTION

This invention is concerned with a power source for underwater tools and more particularly a power source that is energized by electricity. Some of the same problems that are encountered with submersible pumps are also present in the field of an underwater (electrical) power source. The problems are extended, however, in that not only must there be complete insulation of electrical components from water but also the operator must be insulated from electrical components and additionally protected from accidental electric shocks. Broadly, the invention is included in the category of underwater tools used by human divers wherein the customary environment is salt or sea water giving rise to such problems as corrosion, power supply and conversion, wieldability, pressure (such as depths 100 feet and greater), etc.

The current rapid expansion of undersea construction, repair and salvage activities has created a demand for underwater tools suitable for use by divers, especially divers using scuba equipment. Tools for these applications must be lightweight, compact, safe, reliable, efficient, and inexpensive. Historically, the tools used by divers have been adaptations of available land use equipment. However, the peculiar environmental constraints imposed on divers often make corresponding land use equipment unsuitable for underwater operations. In the ocean or other bodies of water the near weightlessness, high pressures, low visibility, and low ambient temperatures create both physiological and psychological stresses. Many underwater tasks result in significantly greater physical degradation than comparable surface activity. Also, a free-swimming diver can furnish only limited reaction forces and torques so that the operations he can perform without support, either for himself or for the tool, are seriously limited. There are also limitations as to the amount of time a diver can safely remain underwater due to physiological considerations and air capacities, especially where scuba equipment is employed. These and other factors require a total-system approach to underwater tool development such that a diver can perform a broad range of activities with relative ease in the shortest possible time period.

The various operations typically performed by divers include drilling, tapping, sawing, brushing, grinding, descaling, nut and bolt running, and winching. Many of these operations require slow running speeds and others require axial as well as rotary forces to be applied. The work of divers often requires combinations of these typical operations, for example drilling, tapping, and bolt running. It would be difficult, if not impossible, for a diver, especially a free-swimming diver, to carry with him individual tools for each of the various operations he may be required to perform. The present invention allows a diver to perform a wide variety of tasks while transporting only a minimal amount of apparatus. This gives the diver greater flexibility and maneuverability and eliminates frequent surfacing and travel to and from a central tool supply locker.

DESCRIPTION OF THE PRIOR ART

Although there are a number of submersible power sources, especially electrically energized pumps, the concept of a hand held electrically energized tool for underwater use has generally been avoided due to the psychological reaction of human divers and the general belief that the insulating problems would be too great. As a result the majority of underwater tools are pneumatically or hydraulically operated having either open or closed fluid systems. The pneumatic and hydraulic systems usually require connecting lines to a pressurizing device such as a compressor or a short term supply of pressurized fluid is carried by the diver such as a compressed air bottle. Other possibilities include power converting chambers positioned underwater that convert electrical energy to some other activating power. Such converting chambers may be self contained or supplied with power from a surface station. Since power can be readily transmitted by electrical, hydraulic, and pneumatic means, systems have been built around these energy transfer methods, singly and in combination. The components necessary to provide mechanical energy to the tool were coupled with the necessary components which converted energy from the form in which it was transmitted to the tool in form chosen for transmission from its stored form—either chemical, as in fuel or a battery, or mechanical, as in an air bottle.

SUMMARY

This invention includes an electric motor for underwater tool operation, comprising, in combination, a solid stator having the windings encased in a potting compound and capped at the ends, a rotor within the stator supported by water lubricated bearings and clearance between the rotor and stator for water passage, a current-sensitive relay connected through the running windings that connects a capacitor into the starting circuit activated by the high inrush of current when the motor is first turned on, a sealed on-off switch and a sealed reversing switch are provided in the circuit and a trip circuit disconnects the power from the tool upon any current leakage from the high voltage lines. Other features include a water lubricated gear box and at least two output shafts connected to the rotor shaft.

In a hydraulic or pneumatic system, if the system is open (that is where the activating fluid is discharged to the environment after it is used), there are several disadvantages. Usually the supply lines are relatively cumbersome and heavy, the discharged fluid contaminates the working area, and the operating pressure must always exceed the environmental pressure making the device "depth sensitive." In closed systems, if the device is to be insensitive to depth and the system remain closed, there must be dynamic seals which probably still require a pressure source higher than environmental pressure to effect a reverse-leakage principle. Dynamic seals are often unsatisfactory. Lubrication problems also arise in the closed and open system fluid-powdered tools.

Accordingly, it is an object of the present invention to provide a power system for underwater tools that is insensitive to water depth.

Another object of this invention is to provide an electrical power system for underwater tools that is reliable and safe enough to be hand-held by a human being in sea water.

Still another object of this invention is to provide a power system for underwater tools that allows the operator to choose forward or reverse and fast or slow speeds for tool operation.

BRIEF DISCUSSION OF THE DRAWINGS

DESCRIPTION OF THE PREFERRED EMBODIMENT

Figure 1:
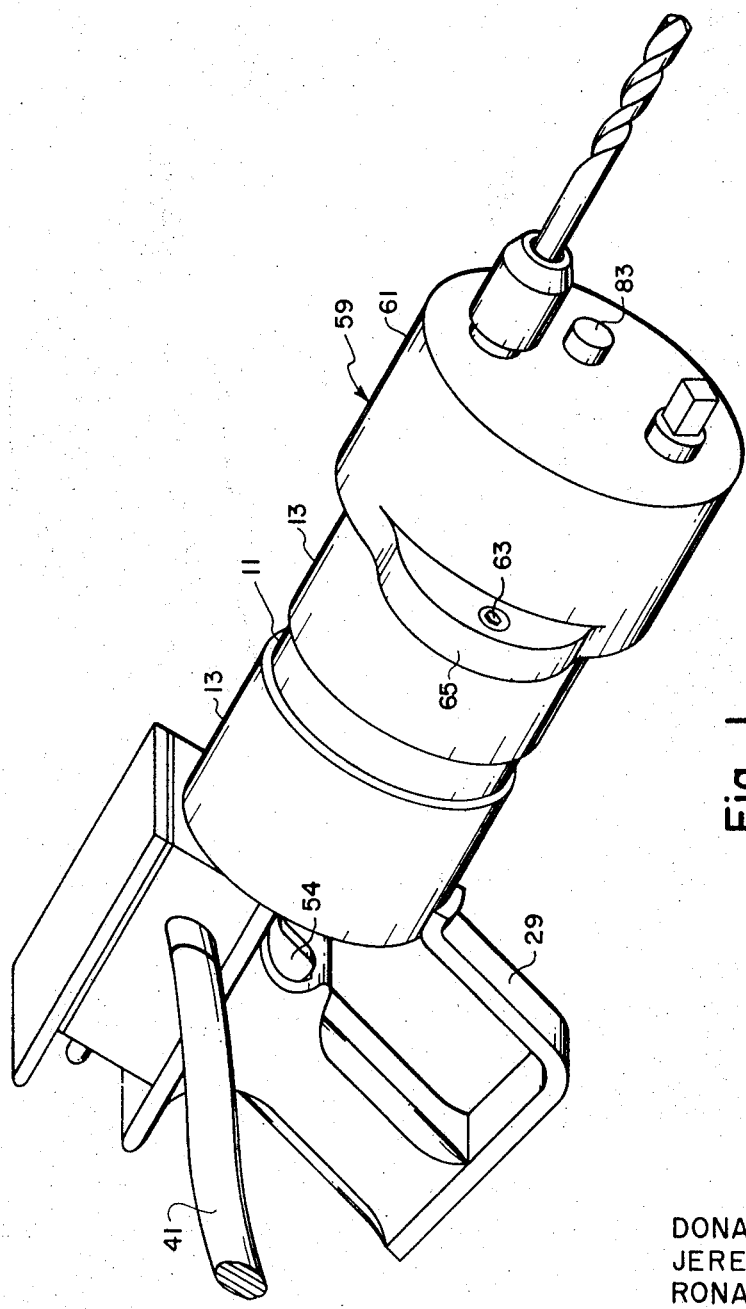
FIG. 1 is a perspective view of the underwater electric motor with a tool attached.
Figure 2:
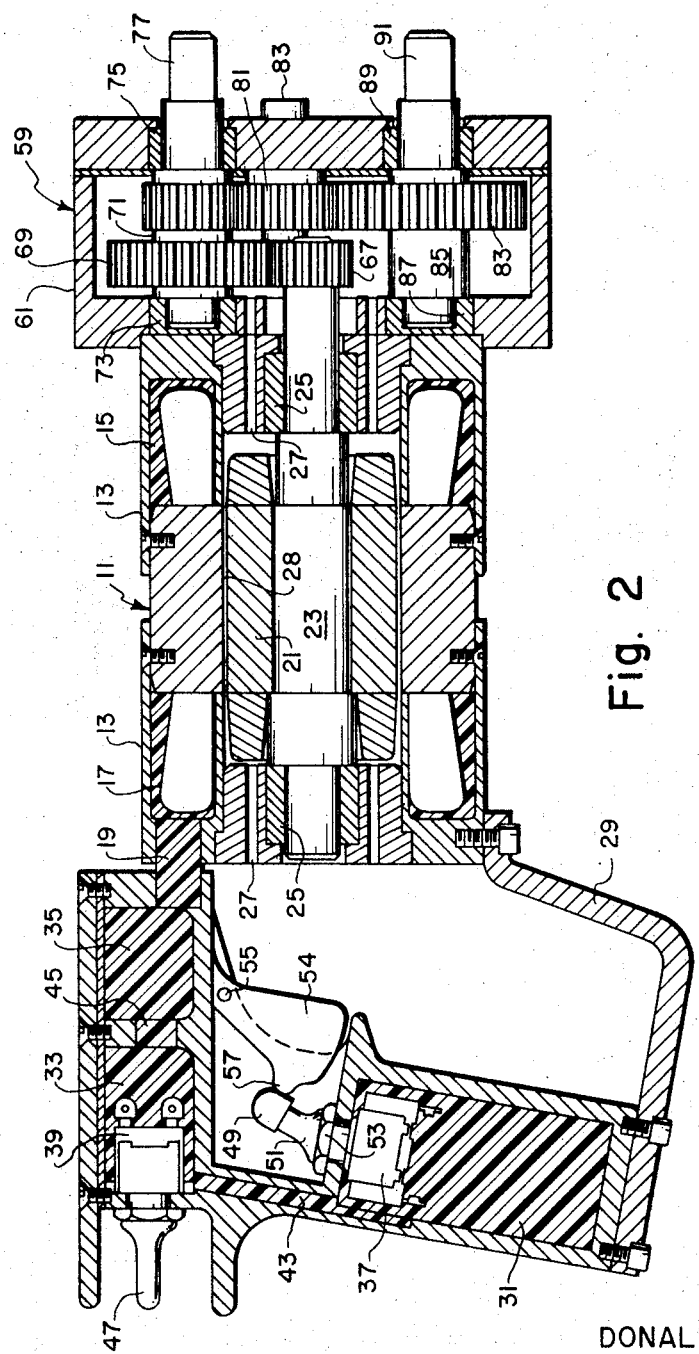
FIG. 2 is an elevational view in cross-section.

Referring to FIGS. 1 and 2 the stator 11 is encased in metal caps 13—13 with potting compound 15 surrounding the windings 17 so that it makes a solid structure. A passage 19 is provided at one end for the electrical leads (not shown). The rotor 21 positioned inside the stator 11 is preferably chrome plated for corrosion proofing. The rotor shaft 23 has bearings 25—25 at each end with passages 27 open to the environment thereby allowing water to flow through them and act as a lubricant. A space 28 is also provided between the stator 11 and rotor 21 for the passage of water.

A handle 29 is attached to the stator 11 by suitable means and includes compartments 31, 33, and 35. Compartment 31 contains the on-off switch 37, compartment 33 contains the reversing switch 39, and compartment 35 is for the connections from the ground-shielded main power line 41 (FIG. 1) to the various electrical leads (not shown) connecting the switches (37, 39) and the motor windings 17. The compartments 31, 33, and 35 are filled with potting compound to prevent any electrical leakage. A passage 43 connects compartments 31 and 33 and a passage 45 connects compartments 33 and 35. Reversing switch 39 is provided with a toggle 47 accessible to the diver. On-off switch 37 is provided with a toggle 49 with a rubber boot 51 sealing between the knob of the toggle and the closure nut 53 on the switch 37. A trigger 54 is pivotally mounted at 55 and has a knob 57 that contacts toggle 49 for finger-operation by the diver.

Figure 3:
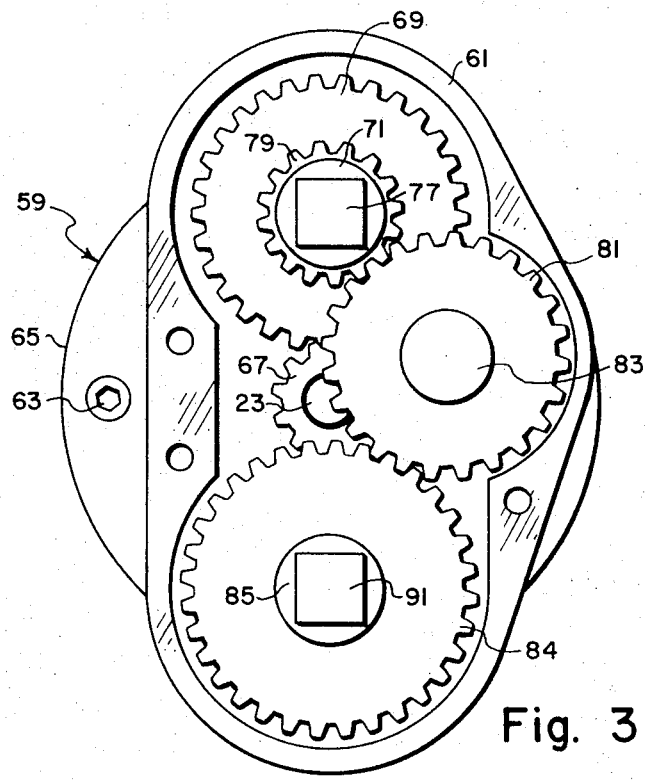
FIG. 3 is a cross-sectional view of the gear box taken along the line 3—3 of FIG. 2.

A gear box 59 is attached to the stator 11 at the end opposite the handle 29. The housing 61 is connected by any suitable means such as a bolt 63 through a flange 65 on the housing 61 into a corresponding flange (covered by flange 65, FIG. 1) on the housing. A pinion 67 on rotor shaft 23 meshes with a high speed driven gear 69 (FIGS. 2 and 3) rotating shaft 71 mounted in rear bearing 73 and front bearing 75. Shaft 71 is connected to output connection 77 and is the high speed output. Also, mounted on shaft 71 is high speed drive gear 79 that meshes with idler gear 81 mounted on shaft 83. Idler gear 81 drives the low speed gear 84 connected to shaft 85. Shaft 85 is mounted in rear bearing 87 and front bearing 89 and is connected to the low speed output shaft 91. Shaft 83 is also provided with suitable bearings (not shown) in housing 61.

Figure 4:
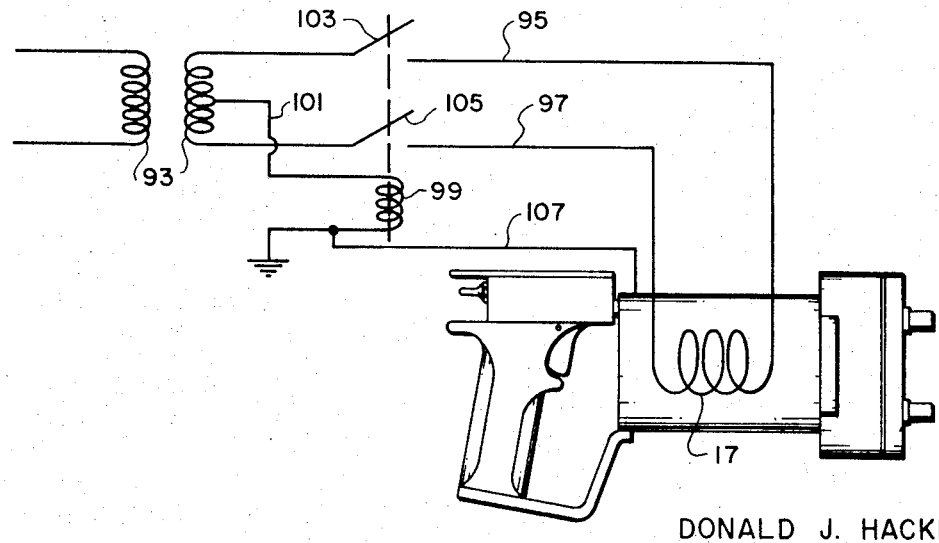
FIG. 4 is a diagram of the electric circuit for disconnecting the electrical source in the event of current leakage from the high voltage lines through the device.

FIG. 4 shows the safety circuit for protecting the diver in case of current leakage. A transformer 93 connected to a main supply of power (not shown) supplies current through leads 95 and 97 to the windings 17. A leakage trip coil 99 is center tapped from the transformer coil through lead 101 and closes contacts 103 and 105 in lines 95 and 97 when the transformer 93 is turned on. A lead 107 from the motor (usually the external covering of the stator 11) is connected to the ground lead 109 of the trip coil 99 so that any current through 107 deactivates the trip coil 99 and disconnects contacts 103 and 105.

Figure 5:
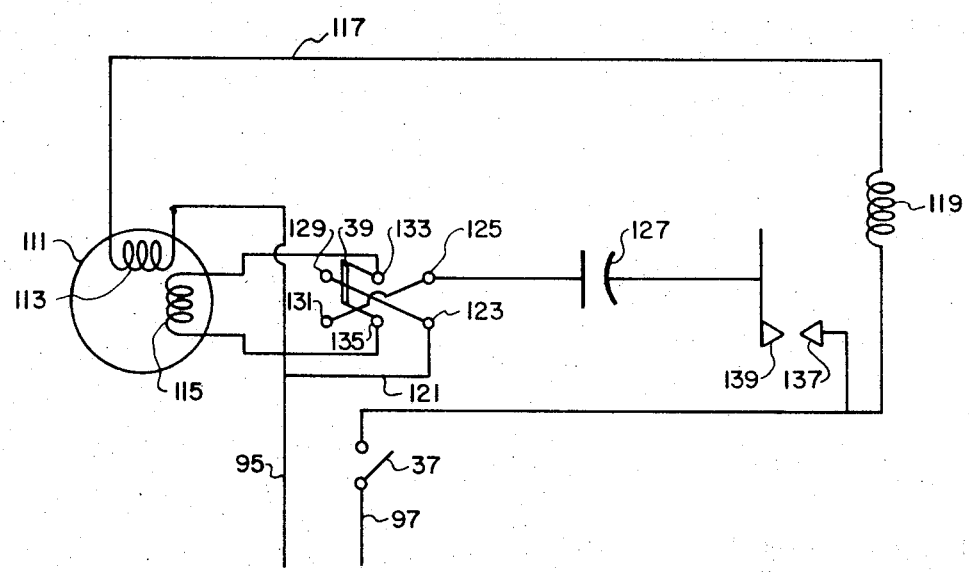
FIG. 5 is a diagram of the motor circuit including the starting portion.

In the diagram of FIG. 5 the motor 111 is shown with the running windings 113 and starting windings 115. The running windings are connected to lead 95 and lead 117. Lead 117 includes a relay 119 and is connected to lead 97 through the on-off switch 37. Lead 95 has a tap-off lead 121 connected to contact 123 of switch 39. Switch 39 also has a contact 125 connected to capacitor 127. Contacts 123 and 125 are connected to contacts 129 and 131 respectively. Also included within switch 39 are contacts 133 and 135 so that depending on the position of switch 39, the contacts 133 and 135 are connected to 129 and 131 or 123 and 125. One position of switch 39 connects the capacitor 127 to one side of the starting windings 115 for rotation in one direction and the opposite position connects the capacitor 127 to the opposite side of the starting windings 115 for rotation in the opposite direction. When the switch 37 is thrown a high rush of current through the current sensitive relay 119 pulls in the contacts 137, 139 and bridges the capacitor 127 into the starting circuit. The capacitor-start motor has the advantage of high starting torque. The starting windings 115 increase torque and as they drop out, the torque approaches zero at synchronous speed. As the load increased, the torque increases as the speed decreases.

It will be understood, of course, that, while the form of the invention herein shown and described constitutes the preferred embodiment of the invention, it is not intended herein to illustrate all of the possible and equivalent forms or ramifications of the invention. It will also be understood that the words used are words of description rather than of limitation and that various changes, such as changes in shape, relative size, and arrangement of parts may be substituted without departing from the spirit or scope of the invention herein disclosed.

We claim:

1. A submersible electric power tool system comprising, in combination:
   (a) a solid stator having induction-type running and starting windings encased in a potting compound and capped at the ends;
   (b) a rotor within said stator supported by water lubricated bearings and clearance between the rotor and stator for the passage of water;
   (c) a current-sensitive relay connected through said running windings and activated by the high inrush of of current when the electric power tool is initially turned on;
   (d) a capacitor connected between said current-sensitive relay and said starting windings for supplying the starting current to said starting windings;
   (e) a sealed on-off switch connected to said running windings; and
   (f) automatic circuit breaking means connected in the power line to said electric power tool for disrupting the electrical power supply upon any electrical leakage from said electric power tool.

2. A submersible electric power tool system in accordance with claim 1 wherein said circuit breaking means includes a hold down relay having the ground line of the coil connected to the frame of the electric tool.

3. A submersible electric power tool system in accordance with claim 2 wherein a sealed reversing switch is connected to said starting windings.

4. A submersible electric power tool system, comprising, in combination:
   (a) a solid stator having induction-type running and starting windings encased in a potting compound and capped at the ends;

(b) a rotor mounted on an output shaft having a pinion on one end, said rotor positioned within said stator, said output shaft being supported by water-lubricated bearings and a clearance between said rotor and stator for the passage of water;

(c) a current-sensitive relay connected through said running windings and activated by the high inrush of current when the electric power tool is initially turned on;

(d) a capacitor connected between said current-sensitive relay and said starting windings for supplying the starting current to said starting windings;

(e) a sealed on-off switch connected to said running windings;

(f) a gear box attached to said stator including a plurality of gears, said plurality of gears coupling said pinion with a plurality of output shafts and providing a speed differential between said output shafts; and (g) automatic circuit breaking means connected in the power line to said electric power tool for disrupting the electrical power supply upon any electrical leakage from said electric power tool.

5. A system as in claim 4, wherein said circuit breaking means includes a hold down relay having the ground line of the coil connected to the frame of the tool.

6. A system as in claim 5, wherein the electrical power is connected to the tool by a transformer winding, and the ungrounded end of the hold down relay coil is connected to a center tap on said transformer winding, so that any electrical leakage causes a current through said relay coil which disconnects contacts in both power lines from said winding to the tool.

7. A system as in claim 2, wherein the electrical power is connected to the tool by a transformer winding, and the ungrounded end of the hold down relay coil is connected to a center tap on said transformer winding, so that any electrical leakage causes a current through said relay coil which disconnects contacts in both power lines from said winding to the tool.

References Cited

UNITED STATES PATENTS

| | | | |
|---|---|---|---|
| 2,346,836 | 4/1944 | Grooms | 318—221 |
| 2,568,548 | 9/1951 | Howard et al. | 310—87X |
| 2,691,740 | 10/1954 | Alburtis | 310—83 |
| 2,944,297 | 7/1960 | Maynard | 310—87X |
| 2,964,660 | 12/1960 | Herrick et al. | 310—87 |
| 3,048,756 | 8/1962 | Voege | 318—207 |
| 3,267,868 | 8/1966 | Page | 310—87X |

ORIS L. RADER, Primary Examiner

G. Z. RUBINSON, Assistant Examiner

U.S. Cl. X.R.

310—83, 87

PO-1050
(5/69)

UNITED STATES PATENT OFFICE
CERTIFICATE OF CORRECTION

Patent No. 3,555,383          Dated January 12, 1971

Inventor(s) Donald J. Hackman, Jeremy M. Harris, Ronald L. Leg and Donald E. Roop It is certified that error appears in the above-identified patent and that said Letters Patent are hereby corrected as shown below:

Column 4, line 69, "claim 2" should read -- Claim 1 --.

Signed and sealed this 6th day of April 1971.

(SEAL)
Attest:

EDWARD M. FLETCHER, JR.          WILLIAM E. SCHUYLER, JR.
Attesting Officer          Commissioner of Patents

Dedication 3,555,383.—*Donald J. Hackman*, Columbus, *Jeremy M. Harris*, Worthington, *Ronald L. Legue*, Columbus, and *Donald E. Roop*, Worthington, Ohio. SUBMERSIBLE ELECTRIC MOTOR FOR TOOL OPERATION. Patent dated Jan. 12, 1971. Dedication filed July 23, 1976, by the assignee, *The Battelle Development Corporation.*

Hereby dedicates to the People of the United States the entire remaining term of said patent.

[*Official Gazette January 18, 1977.*]